C. L. CADLE.
APPARATUS FOR BONDING RAILS.
APPLICATION FILED JAN. 2, 1907.

950,688.

Patented Mar. 1, 1910.
2 SHEETS—SHEET 1.

Witnesses,
E. L. Buck
Jno. F. Oberlin

Inventor
Charles L. Cadle
by J. B. Fay
his attorney.

C. L. CADLE.
APPARATUS FOR BONDING RAILS.
APPLICATION FILED JAN. 2, 1907.
950,688.
Patented Mar. 1, 1910.
2 SHEETS—SHEET 2.
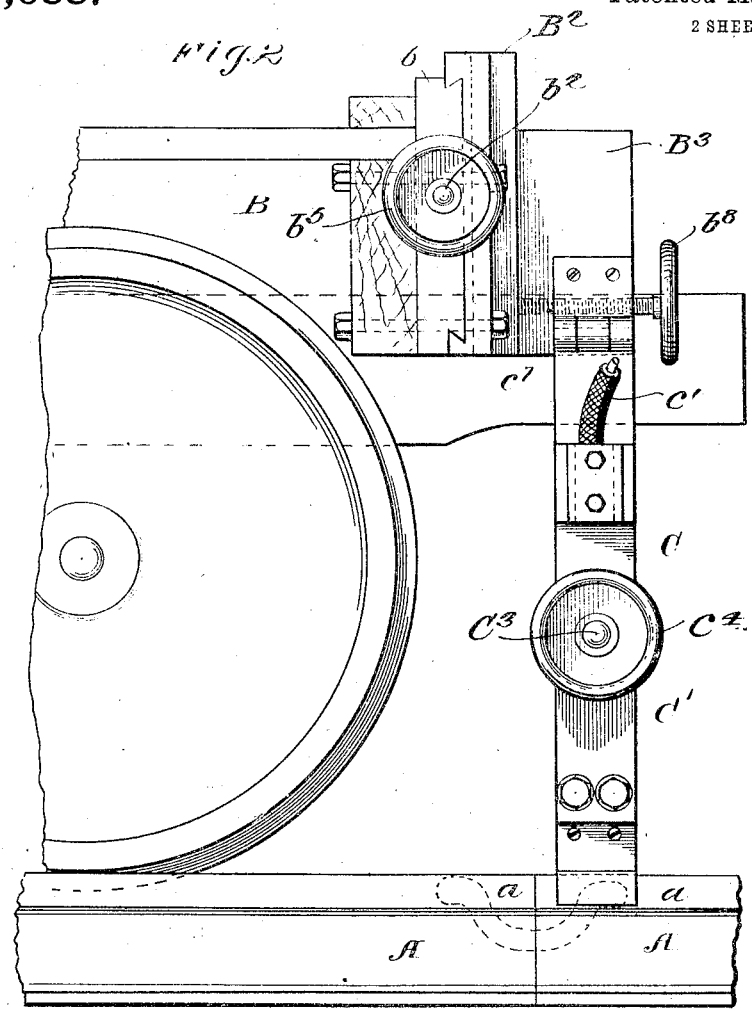
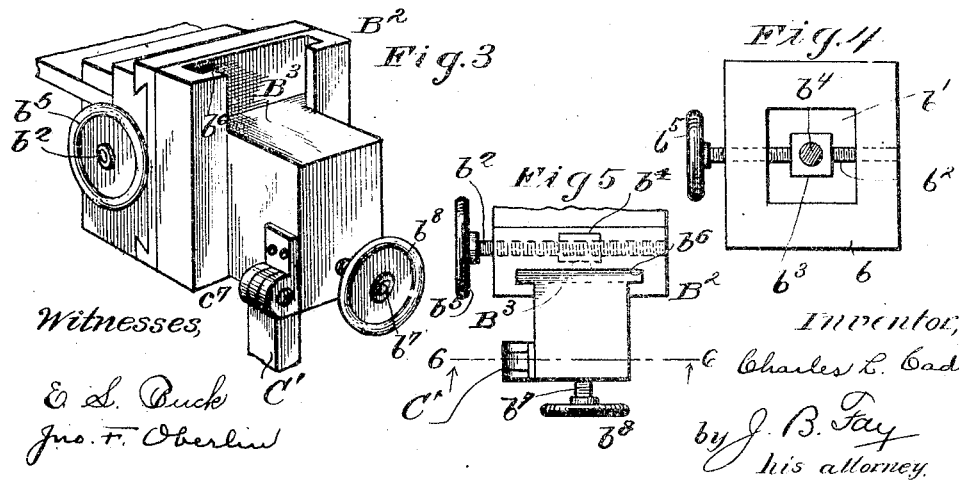
Witnesses,
E. L. Buck
Jno. F. Oberlin
Inventor,
Charles L. Cadle,
by J. B. Fay
his attorney.

UNITED STATES PATENT OFFICE.

CHARLES L. CADLE, OF CLEVELAND, OHIO, ASSIGNOR TO THE ELECTRIC RAILWAY IMPROVEMENT COMPANY, OF CLEVELAND, OHIO, A CORPORATION OF OHIO.

APPARATUS FOR BONDING RAILS.

950,688. Specification of Letters Patent. Patented Mar. 1, 1910.

Application filed January 2, 1907. Serial No. 350,330.

*To all whom it may concern:*

Be it known that I, CHARLES L. CADLE, a citizen of the United States, resident of Cleveland, county of Cuyahoga, and State of Ohio, have invented a new and useful Improvement in Apparatus for Bonding Rails, of which the following is a specification, the principle of the invention being herein explained, and the best mode in which I have contemplated applying that principle, so as to distinguish it from other inventions.

My invention relates to the art of bonding rails or similar conductors by the use of an electric current whereby sufficient heat is developed at the proper points to solder, braze or weld a bonding member across the gap intervening between the meeting ends of the rails.

The object of this invention is to provide a simple and inexpensive device whereby such operation may be effected conveniently and with expedition.

To the accomplishment of these ends said invention, then, consists of means hereinafter fully described and particularly pointed out in the claims.

The annexed drawings and the following description set forth in detail certain means embodying the invention, such disclosed means constituting but one of various mechanical forms in which the principle of the invention may be used.

Figure 1:
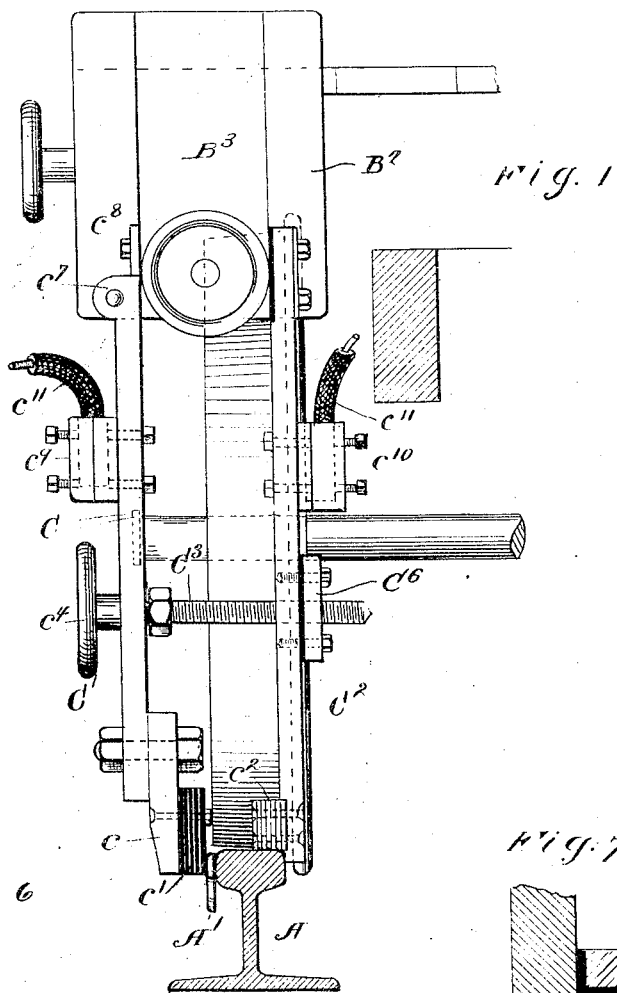
Figure 6:
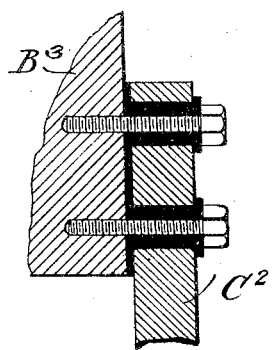
Figure 7:
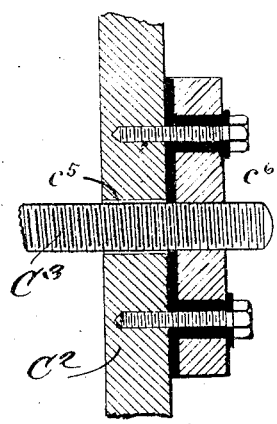

In said annexed drawings: Figure 1 represents in elevation an approved form of my device in connection with a portion of a truck such as I contemplate using to support the device while in use in the field; Fig. 2 represents a side elevation of such device and truck; Fig. 3 represents in perspective a detail of such device; Fig. 4 is a view in elevation of a slide-way forming a feature of such detail; Fig. 5 is a plan view of such detail; Fig. 6 is a vertical transverse section of the upper end of one of the pendent arms, forming another feature of my device, and is designed to show the manner in which such arm is attached to this support; and Fig. 7 is a cross-section taken on substantially the same plane as that of Fig. 6, through a portion of such arm intermediate of its ends and similarly showing in detail the manner in which the clamping bolt is mounted in such arm.

The method of bonding rails, for the carrying out of which my improved apparatus is particularly designed, is that of electrically soldering, brazing or welding the bonding member laterally against the respective ends of two terminally adjoining rails by means of an electric current which is passed through the same, a sufficiently high resistance being interposed in the circuit in proximity to the bond to develop the necessary degree of temperature.

An inspection of Figs. 1 and 2 will disclose two meeting rail sections. A with the apparatus now about to be described in proper position with reference thereto, to effect the aforesaid operation of bonding. Such apparatus, as has been indicated, is preferably supported from a truck B, a portion of which alone appears in said figures of reference. Truck B is movable along the track whereof the rails A are a component part, and it will be understood that ordinarily the current whereby the bonding is effected is derived from the trolley wire and return circuit usually found in connection with such track where the operation of bonding is carried on in the fashion here set up.

My apparatus, then, comprises primarily a rail clamping device C that is adjustably supported from such truck B, preferably from one end of the same. To provide the adjustable mounting for clamping device C, said truck B is provided transversely with a slide-way $b$ having a longitudinal central opening $b'$. Fig. 4. A threaded shaft $b^2$ is rotatably mounted in such slide-way $b$ and intersects the opening $b'$ therein. Lying in the opening in question in the slide-way, is a nut $b^3$ mounted upon threaded shaft $b^2$ which nut is obviously, upon rotation of the shaft, longitudinally reciprocable of the slide-way. Rotation of the shaft is conveniently effected when desired by means of a hand-wheel $b^5$ mounted on its projecting end. Nut $b^3$ is provided with an outwardly projecting stud $b^4$ which is designed to be engaged, when the parts of the device are properly assembled, by the inner face of a block $B^2$, Figs. 2, 3 and 5, that is itself provided with a vertical slide-way $b^6$. In this vertical slide-way $b^6$ is in turn mounted a block $B^3$ that may be adjustably secured in any desired position in such slide-way by means of a heavy set screw $b^7$ provided with a hand wheel $b^8$ at its outer end.

The clamping device proper, comprises two pendent members or arms C' C² secured at their upper ends to this block B³ and respectively adapted to rest with their lower ends against the inner and outer sides of rail sections A. One of said members, the outer one as shown, is provided near its lower end with a removable section c on which is secured a block of carbon c' or equivalent high resistance material. The other arm C² is provided near its lower end with a lateral projecting foot C² preferably composed of a laminated copper block. The disposition of the carbon resistance block c' and the laterally projecting copper block c² is such relatively to each other and to the rail A as to permit the former to rest against the side of such rail when the latter rests upon the top of the same. In order to draw the two members C' C² together to clamp the rail between such lower ends I provide a bolt C³, that is rotatably mounted in the outer member C' and has a screw threaded engagement with inner member C². To render manipulation of bolt convenient, it is provided on its outer end with a hand wheel of usual pattern. The inner end of the bolt does not engage arm C² directly, an aperture c⁵ Fig. 7, being provided in the latter, of a diameter greater than that of the bolt so as to prevent such bolt from contacting therewith at all; such threaded engagement is had, instead, with a plate c⁶ rigidly mounted on the arm but thoroughly insulated therefrom in the fashion indicated in Fig. 7. Arm C² is likewise carefully insulated from block B³ at its point of attachment to the latter, a preferable method of effecting such insulation being that indicated in Fig. 6. Of the two arms C' C², the former or outermost arm is the one preferably given outward movement, in respect to the other, and to this end, it is pivotally attached at its upper end to block B³, a hinge joint c⁷, Figs. 1 and 2, being preferably employed. Arms C' C² being preferably formed of steel bars, I have found it desirable to make hinge member c⁸ whereby the outer of the arms is thus attached to block B³, of cast metal in order that such hinge portion may break in case of an obstruction being encountered by the arm rather than that the arm should be twisted or the adjustable supporting members be thrown out of bearing. Binding posts c⁹ c¹⁰ of any approved type are provided on the respective arms C' C² whereby conductors c¹¹ for conducting the current, as will now be described, may be attached.

Having thus described in detail the construction of my improved bonding apparatus, the manner in which the same is operated may now be briefly set up.

The truck B is first moved on the track to position the clamping device, proper, substantially over the abutting rail ends, Fig. 2. The clamping device, which pending transportation, has of necessity to be raised to some distance above the rail in order to avoid injury, is now lowered by unclamping block B³. To properly transversely position the clamping device hand wheel b⁵ is rotated one way or the other whereby transversely movable block B², and with it block B³, can be shifted as desired. The pendent arms C' C² being thus brought into the position indicated in Figs. 1 and 2, one terminal of a bond A' is then introduced between resistance blocks c' and the opposing rail faces a a and hand wheel c⁴ rotated to clamp the same firmly in position. The current is then turned on and due to the heat developed by resistance member c' the temperature of the bond terminals and the adjacent faces of the rail is raised sufficiently to melt the solder or braze, with which such bond terminals are provided, or else to weld the same directly to the rail, as the case may be.

In order that no current may be wasted and a good contact and consequently perfect junction had between bond and rail, the faces a a of the rail require preliminary to the operation just described to be abraded so as to present a perfectly clean metallic surface. In order to avoid the necessity of thus cleaning the inner face of the rail against which clamp member C² presses, and which it is equally essential should have good electric contact with the rail, I provide the laterally projecting foot or block c² which presses upon the top or tread of the rail. Such top or tread—it will be understood in the case of track that is in use—is always maintained bright and clean owing to the frequent passage thereover of the wheels of cars. Hence a good electric contact is had by simply allowing such foot to rest solidly upon the same the necessity for mechanically cleansing the rail top to form such contact being done away with. The necessity for drawing arms C' C² tightly together in order to maintain a good contact between the inner arm and the rail is likewise obviated, since the weight of the apparatus resting upon the top of the rail suffices for this purpose. The outer arm may accordingly be approached more or less closely to the side of the rail to clamp the bond more or less tightly thereto as may be desired, without affecting the character of the electrical contact had by the other arm with such rail. This feature is of more or less use in the various methods of electrical bonding at present in vogue, but presents a particular advantage in the carrying on of my improved method of bonding which forms the subject matter of a co-pending application for U. S. Letters Patent filed January 2, 1907, Serial No. 350,331.

Other modes of applying the principle of my invention may be employed instead of the one explained, change being made as regards the mechanism herein disclosed, provided the means stated by any one of the following claims or the equivalent of such stated means be employed.

I therefore particularly point out and distinctly claim as my invention:—

1. In apparatus of the class described, the combination with a suitable support; of a rail clamping device mounted on said support so as to be movable vertically and horizontally with respect thereto, such device comprising two pendent spaced arms, insulated from each other and adapted to rest against the side and upon the top of a rail, respectively; means adapted to move said members relatively to each other to clamp a bond against such rail; and independent electrical connections for said arms.

2. In apparatus of the class described, the combination with a suitable support; of a rail clamping device mounted on said support, such device comprising two pendent members insulated from each other and adapted to rest against the inner and outer sides of a rail, respectively; one of said members being provided with a lateral projection adapted to rest upon the top of such rail; means adapted to move such members relatively to each other to clamp such rail between them; and independent electrical connections for said arms.

3. In apparatus of the class described, the combination with a suitable support; of a rail clamping device mounted on said support so as to be movable vertically and horizontally with respect thereto, such device comprising two pendent spaced arms insulated from each other and adapted to rest against the inner and outer sides of a rail, respectively, one of said members being provided with a lateral projection adapted to rest upon the top of such rail; means adapted to move such members relatively to each other to clamp such rail between them; and independent electrical connections for said arms.

4. In apparatus of the class described, the combination of a suitable support movable along a track; said support bearing a transverse slide-way; a block movably mounted in said slide-way; and a rail clamping device wholly supported from said block, such device comprising two pendent members insulated from each other and adapted to rest against the inner and outer sides of a rail, respectively, means adapted to move said members relatively to each other to clamp such rail between them; and independent electrical connections for said members.

5. In apparatus of the class described, the combination of a suitable support movable along a track; said support bearing a transverse slide-way; a block movably mounted in said slide-way; and a rail clamping device supported from said block, such device comprising two pendent spaced arms insulated from each other and adapted to rest against the inner and outer sides of a rail, respectively; one of said members being provided with a lateral projection adapted to rest upon the top of such rail; means adapted to move such members relatively to each other to clamp such rail between them; and independent electrical connections for said arms.

6. In apparatus of the class described, the combination with a suitable support movable along a track, said support bearing a transverse slide-way; a block having a vertical slide-way mounted on said transverse slide-way; means adapted to adjustably position said block; a second block mounted on said vertical slide-way; means adapted to adjustably secure said second block thereon; and a rail-clamping device supported from such second block, such device comprising two pendent members insulated from each other and adapted to rest against the inner and outer sides of a rail, respectively, means adapted to move said members relatively to each other to clamp such rail between them; and independent electrical connections for said members.

7. In apparatus of the class described, the combination with a suitable support movable along a track, said support bearing a transverse slide-way; a block having a vertical slide-way mounted on said transverse slide-way; means adapted to adjustably position said block; a second block mounted on said vertical slide-way; means adapted to adjustably secure said second block thereon; and a rail clamping device supported from such second block, such device comprising two pendent spaced arms insulated from each other and adapted to rest against the inner and outer sides of a rail, respectively, one of said members being provided with a lateral projection adapted to rest upon the top of such rail; means adapted to move such members relatively to each other to clamp such rail between them; and independent electrical connections for said arms.

8. In apparatus of the class described, the combination of a suitable support movable along a track, said support bearing a transverse slide-way formed with a central opening; a threaded shaft rotatably mounted in said slide-way and intersecting such opening; a nut mounted on said shaft and lying in said opening, said nut being provided with an outwardly projecting stud; a block having a vertical slide-way mounted on said transverse slide-way and engaging such projecting stud; a second block mounted on such vertical slide-way; means adapted to adjustably secure said second block therein; and a rail-clamping device supported from said block.

9. In apparatus of the class described, the combination with a suitable support movable along a track; of a rail-clamping device supported therefrom, such device comprising two pendent spaced arms insulated from each other and adapted to rest against the outer and inner sides of a rail, respectively; a high resistance member removably secured to the lower end of the first of said arms; a laterally projecting foot secured near the lower end of the second thereof and adapted to rest upon the top of the rail; means adapted to move such members relatively to each other to clamp such rail between their lower ends; and independent electrical connections for said arms.

10. In apparatus of the class described, the combination with a suitable support movable along a track; of a rail-clamping device supported therefrom, such device comprising two pendent spaced arms insulated from each other and adapted to rest against the outer and inner sides of a rail, respectively; a high resistance member removably secured to the lower end of the first of said arms; a laterally projecting laminated copper block secured near the lower end of the second thereof and adapted to rest upon the top of the rail; a bolt rotatably mounted in the outer, and having a screw-threaded engagement with the inner, of said arms; and independent electrical connections for said arms.

11. In apparatus of the class described, the combination with a suitable support, of means borne thereby for making electrical connection with a rail, such means including a vertically slidable block and a member depending from such block and adapted to rest on the top of the rail being operated upon.

12. In apparatus of the class described, the combination with a suitable support, of means for clamping a nd against a rail, said means including a member adapted to rest on the top of such rail, whereby direct electrical contact with the latter may be secured.

13. In apparatus of the class described, a clamp member for making electrical connection with a rail, such member including a laterally projecting portion adapted to rest upon the top of such rail when said member is drawn thereagainst.

14. In apparatus of the class described, a clamp member for making electrical connection with a rail, such member including a laterally projecting laminated copper block adapted to rest upon the top of such rail when said member is drawn thereagainst.

15. In apparatus of the class described, the combination with a suitable support, of a clamping device borne thereby, said device comprising two members, and means adapted to apply said members with unequal pressures to the article being operated upon.

16. In apparatus of the class described, the combination with a suitable support, of a clamping device borne thereby, said device comprising two members, means for moving one of said members into contact with one portion of the article being operated upon, and means adapted to move the other member into contact with another portion of such article, said means being independently operable whereby said members may be held against the article with unequal pressures.

17. In apparatus of the class described, the combination with a suitable support, of a clamping device borne thereby, said device comprising two members, means for moving one of said members downwardly into contact with the article being operated upon, and means adapted to draw the other member toward such first member, so as to contact with the side of such article without affecting the degree of pressure exerted by said first member.

18. In apparatus of the class described, the combination with a suitable support, of a clamping device borne thereby, said device comprising two members connected in an electric circuit, one of said members being movable into and out of contact with the top of a rail and the other being movable toward and away from the side of such rail and means adapted to move one of said members without affecting the degree of pressure exerted by the other.

19. In apparatus of the class described, the combination with a suitable support, of a clamping device borne thereby, said device comprising two members connected in an electric circuit and conjointly movable in a substantially vertical direction, one of said members being also movable in a substantially horizontal direction and means adapted to thus move said last-named member without affecting the degree of pressure exerted by the other.

20. In apparatus of the class described, the combination with a suitable support, of a clamping device borne thereby and comprising a vertically movable block, and two members depending from said block and conjointly movable therewith, said members being connected in an electric circuit and one thereof being independently movable transversely of the direction of movement of said block so as to press against an article without affecting the degree of pressure exerted by the other member.

21. In apparatus of the class described, the combination with a suitable support, of a clamping device borne thereby and comprising a vertically slidable block, and two members depending from said block and conjointly movable therewith, said members being connected in an electric circuit and one thereof being rigidly secured to said block while the other is pivotally attached to the same.

22. In apparatus of the class described, the combination with a suitable support, of a clamping device borne thereby and comprising a vertically movable block, two members depending from said block and conjointly movable therewith, said members being connected in an electric circuit and one thereof being rigidly secured to said block while the other is attached to said block so as to be movable transversely thereof, and means connecting said two members whereby such movable one may be drawn toward the other.

23. In apparatus of the class described, the combination with a suitable support, of a clamping device borne thereby, said device comprising a vertically slidable block and two members depending therefrom, said members being adapted to be laterally applied to a rail and one of the same including a laterally projecting portion adapted to rest on the top of such rail, the weight of said block and members serving to effect electrical contact between such projecting portion and the rail top.

24. In apparatus of the class described, the combination with a suitable support, of a clamping device borne thereby, said device comprising a vertically slidable block and two members depending therefrom, said members being adapted to be laterally applied to a rail and one of the same including a laminated copper block projecting from its inner face and adapted to rest on the top of such rail, the weight of said block and members serving to effect electrical contact between such projecting portion and the rail top.

Signed by me, this 27th day of December, 1906.

CHARLES L. CADLE.

Attested by—
D. S. DAVIES,
JNO. F. OBERLIN.